(12) United States Patent
Kadaba et al.

(10) Patent No.: US 7,647,233 B2
(45) Date of Patent: Jan. 12, 2010

(54) SYSTEMS AND METHODS FOR PROVIDING BUSINESS INTELLIGENCE BASED ON SHIPPING INFORMATION

(75) Inventors: Nagesh Kadaba, Roswell, GA (US); Sumeet Shroff, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 10/176,467

(22) Filed: Jun. 21, 2002

(65) Prior Publication Data

US 2003/0236688 A1    Dec. 25, 2003

(51) Int. Cl.
*G06Q 10/00* (2006.01)
*G06F 17/00* (2006.01)
*G06F 9/44* (2006.01)

(52) U.S. Cl. .............................. 705/1; 705/7; 705/400
(58) Field of Classification Search ..................... 705/1, 705/7, 8, 9, 10, 28, 29, 26, 408, 410, 401, 705/400
See application file for complete search history.

(56) References Cited

U.S. PATENT DOCUMENTS

| | | | |
|---|---|---|---|
| 5,191,523 A | 3/1993 | Whitesage | |
| 5,265,006 A | 11/1993 | Asthana et al. | |
| 5,337,246 A | 8/1994 | Carroll et al. | |
| 5,402,336 A | 3/1995 | Spiegelhoff et al. | |
| 5,450,317 A | 9/1995 | Lu et al. | |
| 5,528,489 A * | 6/1996 | Asahara et al. | 705/9 |
| 5,631,827 A | 5/1997 | Nicholls et al. | |
| 5,758,147 A | 5/1998 | Chen et al. | |
| 5,832,453 A | 11/1998 | O'Brien | |
| 5,910,896 A | 6/1999 | Hahn-Carlson | |
| 5,918,207 A | 6/1999 | McGovern et al. | |
| 5,918,219 A | 6/1999 | Isherwood | |
| 5,974,395 A | 10/1999 | Bellini et al. | |
| 6,018,725 A | 1/2000 | Boucher et al. | |
| 6,026,378 A | 2/2000 | Onozaki | |

(Continued)

FOREIGN PATENT DOCUMENTS

EP    0829057 B1 *    3/1999

(Continued)

OTHER PUBLICATIONS

Morton, Roger, "Talking turkey on the Web", Nov. 1998, Transportation and Distribution, vol. 30, Iss. 11, pp. 73.*

(Continued)

*Primary Examiner*—John W Hayes
*Assistant Examiner*—Fadey S Jabr
(74) *Attorney, Agent, or Firm*—Alston & Bird LLP (57) ABSTRACT

A business intelligence system is disclosed that utilizes shipping information to provide business intelligence to a user. The business intelligence system receives information pertaining to originating parcel pickup and delivery information, stores the information in a shipping information database, and allows a user to formulate various types of transaction requests. The transaction results provide shipping information categorized in various ways in regard to past shipments as well as compare one category shipping information with another category of shipping information or with categories of non-shipping information. In addition, the system can extrapolate certain categories of shipping information into the future. Further, the system provides information to a user in a variety of formats including various graphical formats, tabular formats, and cartographical formats.

3 Claims, 8 Drawing Sheets

U.S. PATENT DOCUMENTS

| | | | |
|---|---|---|---|
| 6,032,121 | A | 2/2000 | Dietrich et al. |
| 6,049,782 | A | 4/2000 | Gottesman et al. |
| 6,058,370 | A | 5/2000 | Church et al. |
| 6,061,658 | A | 5/2000 | Chou et al. |
| 6,073,140 | A | 6/2000 | Morgan et al. |
| 6,078,924 | A | 6/2000 | Ainsbury et al. |
| 6,101,484 | A | 8/2000 | Halbert et al. |
| 6,115,691 | A * | 9/2000 | Ulwick ............ 705/7 |
| 6,122,628 | A | 9/2000 | Castelli et al. |
| 6,134,541 | A | 10/2000 | Castelli et al. |
| 6,151,582 | A | 11/2000 | Huang et al. |
| 6,167,378 | A | 12/2000 | Webber, Jr. |
| 6,195,651 | B1 | 2/2001 | Handel et al. |
| 6,205,431 | B1 | 3/2001 | Willemain et al. |
| 6,292,784 | B1 * | 9/2001 | Martin et al. ............ 705/11 |
| 6,591,243 | B1 * | 7/2003 | Grettve et al. ............ 705/8 |
| 2002/0038235 | A1 * | 3/2002 | Musafia et al. ............ 705/11 |
| 2002/0065731 | A1 * | 5/2002 | Schloss ............ 705/26 |
| 2002/0069096 | A1 * | 6/2002 | Lindoerfer et al. ............ 705/7 |
| 2002/0095347 | A1 * | 7/2002 | Cummiskey ............ 705/26 |
| 2002/0107820 | A1 * | 8/2002 | Huxter ............ 705/402 |
| 2002/0116241 | A1 * | 8/2002 | Sandhu et al. ............ 705/7 |
| 2002/0123943 | A1 * | 9/2002 | Gupta et al. ............ 705/28 |
| 2002/0178023 | A1 * | 11/2002 | Bjerre et al. ............ 705/1 |
| 2002/0184043 | A1 * | 12/2002 | Lavorgna et al. ............ 705/1 |
| 2003/0009361 | A1 * | 1/2003 | Hancock et al. ............ 705/7 |
| 2003/0033210 | A1 * | 2/2003 | Ma et al. ............ 705/26 |
| 2003/0093388 | A1 * | 5/2003 | Albright ............ 705/400 |
| 2003/0145043 | A1 * | 7/2003 | Matuska ............ 709/203 |
| 2003/0149674 | A1 * | 8/2003 | Good et al. ............ 705/402 |
| 2005/0021346 | A1 * | 1/2005 | Nadan et al. ............ 705/1 |
| 2005/0165658 | A1 * | 7/2005 | Hayes et al. ............ 705/26 |
| 2005/0209913 | A1 * | 9/2005 | Wied et al. ............ 705/12 |
| 2005/0246359 | A1 * | 11/2005 | Robbins ............ 707/100 |
| 2005/0278657 | A1 * | 12/2005 | Davidson et al. ............ 715/963 |
| 2006/0173693 | A1 * | 8/2006 | Arazi et al. ............ 705/1 |

FOREIGN PATENT DOCUMENTS

| | | | |
|---|---|---|---|
| EP | 1077420 | A2 * | 2/2001 |
| EP | 1111562 | A2 * | 6/2001 |
| FR | 2791799 | A1 * | 10/2000 |
| JP | 09-034873 | | 2/1997 |
| JP | 2001-341812 | A * | 12/2001 |
| JP | 2002-056341 | | 2/2002 |
| JP | 2002-157313 | | 5/2002 |
| WO | WO 96/13015 | A2 * | 5/1996 |
| WO | WO0193085 | A1 * | 6/2001 |
| WO | WO 02/091130 | A2 * | 11/2002 |

OTHER PUBLICATIONS

Tangeman, Nanci, "The International Logistics of Freight Forwarding: Performance Measurement at the Harper Group", Winter 1993-1994, V.13, N. 1, pp. 107-114.*

MacDonald, Mitchell, "Tips on Truckload Shipping", May 1993, V.32, N. 5, pp. 63.*

"Method and System for Capture and Analysis of Product Delivery Dates", Dec. 6, 1001, PCT.*

Rosario, Rosas Vega, "The impact of Enterprise Resource Planning on Forecasting", 2001, Texas A&M University.*

Vedder, Richard G. et al., CEO and CIO Perspectives on Competitive Intelligence, *Communications of the ACM*, pp. 109-116, Aug. 1999, vol. 42, No. 8, U.S.

Sena, James A. et al., Intelligence Systems: A Sociotechnical Systems Perspective, *SIGCPR '99* New Oreleans LA USA, pp. 86-93, U.S.

*UPS: Business Solutions*, UPS Business Communications Services, http://www.ups.c m/buss 1/busscmserv/index.html, Trademark and Tariff Information, Aug. 23, 2001.

*Computer On-Line Data Warehousing*, Integrated Computer On-Line Data Warehousing (COLD), http://ceim gesystems.hyperm rt.net/c ld_dt t.htm, CEO Image Systems, Aug. 23, 2001.

* cited by examiner

| From | To | Avg. Volume | Avg. Weight | Shipping Charges/year |
|---|---|---|---|---|
| Los Angeles | Denver | 39143 | 14.4lbs | $390K |
| Los Angeles | St. Louis | 10,200 | 12.3lbs | $110K |
| Los Angeles | New York | 42,000 | 13.0lbs | $510K |
| | | | Total | $910K |
| St. Louis | Denver | 39143 | 14.4lbs | $250K |
| St. Louis | St. Louis | 10,200 | 12.3lbs | $55K |
| St. Louis | New York | 42,000 | 13.0lbs | $320K |
| | | | Total | $625K |

Speculative Transaction Result Analysis

Fig. 7

SYSTEMS AND METHODS FOR PROVIDING BUSINESS INTELLIGENCE BASED ON SHIPPING INFORMATION

FIELD OF INVENTION

The present invention relates to business intelligence systems using shipping information.

BACKGROUND OF THE INVENTION

The shipping of goods between businesses, such as retailers and suppliers, has been automated to the extent such that computer systems are regularly involved. Communication between computer systems between the originating shipping location and the carrier has all but eliminated the need for manual preparation of manifests, shipping labels, weight and rate calculations, and calculating associated parcel shipping charges.

Similarly, carriers have also incorporated computers to assist in the shipping of parcels in virtually all aspects. Frequently, a carrier will maintain records for each individual item handled, and this is routine for carriers delivering parcels. Some carriers also maintain real time status information for each parcel, allowing a carrier to track and monitor the progress of a parcel as it is being shipped. Some carriers maintain tracking data for each individual parcel for their own tracking applications and allow access to the same information to the parcel's originators and recipients. This may be a free service designed to augment the basic service provided by a carrier. An individual parcel's delivery status information is valuable to users for a variety of reasons.

Aggregate shipping information pertaining to parcel delivery is also useful to users, but as a source of business intelligence. Shipping information can provide businesses with insight regarding growth areas, trends, and sales volumes. In an environment in which an originator at a single location sends parcels to another business at a single destination, aggregate shipping data as a form of business intelligence can be easily obtained. Frequently, the computer systems employed to manage incoming or outgoing parcels can generate reports regarding the volume of packages, or total cost in shipping charges over a specified time period. Such information can even be used to compare figures in a current shipping period with a past shipping period. In the context of a single point of origination, reviewing shipping records is fairly simple when obtained from the computer system that prepares parcels for shipping.

However, many businesses today do not have a single location. It is common for retail businesses to have a national presence with hundreds or even thousands of business locations. For many businesses, multiple retail locations may exist in a given city, state or region. In large cities, suppliers may have multiple warehouse locations from which goods are shipped. Frequently, regional warehouses may be established with replicating inventories, such as in grocery distribution, or regional warehouses may be established with disjoint inventories, such as in manufacturing industries. Thus, even though a single vendor's ships products to a single customer, the shipments may originate from a variety of locations, and similarly, may be directed to a variety of destinations.

Consequently, analyzing shipping information is complicated because of the de-centralized nature of the shipping information. Shipping information related to a single origination or destination cannot provide a comprehensive perspective when multiple locations are involved. Some businesses with multiple shipping/receiving locations coordinate and collect shipping information, but various complications can arise. For example, various parcel processing systems and communication standards may significantly complicate the process of collecting and analyzing shipping information.

For businesses with multiple locations using a single carrier for parcel shipment, shipping information may already be collected and maintained by the carrier in a consistent format. However, even if the carrier allows users to access their shipping data, methods must be devised for analyzing the information. Businesses collecting such data, whether internally or by accessing a carrier's database, require sophisticated analysis requiring the purchase, development and operation of a special purpose information analysis systems. Businesses would require additional personnel and capital resources to develop and deploy such systems. Obviously, a single centralized business intelligence system designed to analyze shipping data shared by multiple users is less expensive than if each user had to develop and deploy individual replicating systems. Therefore, there is a need for a centralized business intelligence system for analyzing shipping information providing such services to users on a shared basis.

The utility of a business intelligence system based only on historical shipping data can be enhanced by consideration of further information, such as economic data. Comparison of shipping data with economic data provides a perspective for interpreting shipping information. For example, knowing that shipping volumes have increased faster than the inflation rate or faster than regional growth rates provides additional insight to interpreting business trends. Other data, such as macro-economic data, may indicate that an increase in units shipped to a given areas may be a function of a growing population base or increasing regional economic activity.

The utility can be further enhanced by combining shipping information with other information provided by the user. For example, information of the number of parcels shipped is made more useful when combined with knowledge of the units packaged in a parcel. Therefore, there is a need for a business intelligence information system incorporating shipping information supplemented with additional data for analyzing shipping data.

SUMMARY OF INVENTION

It is therefore one objective of the present invention to provide a business intelligence system incorporating shipping information comprising a shipping information database, a user profile information database, and a processor in which the system receive user requests, accesses the appropriate data, and communicates the results to the user. It is another objective to provide a business intelligence system incorporating a shipping information database, a user profile database, and a processor receiving user requests including a parameter which is used in modifying data from said shipping information database.

It is another objective of the present invention to provide a method of providing business intelligence based on shipping information by receiving and storing shipping information, receiving a transaction request from a user, retrieving the appropriate shipping information, and processing the information to provide the resulting data in a format associated with the user. It is another objective of the present invention to provide a method of business intelligence based on shipping information by receiving and storing shipping information, receiving a transaction request from a user, retrieving the appropriate shipping information, and processing the information to provide the resulting data in a format associated with the user wherein the user indicates a parameter which modifies the shipping information.

It is therefore another object of the present invention to provide an apparatus for providing business intelligence based on a shipping information database, a statistical information database, a user authorization and profile database, and a computer processing requests, accessing the databases, and communicating the resulting data to the user.

DETAILED DESCRIPTION

System Overview

The present invention is directed to a business intelligence system incorporating shipping information obtained and maintained by a shipping service provider or common carrier ('carrier'). The item shipped may be a parcel, letter, package, crate, envelope, box, tube, container, or similar item. Items shipped may be individual, or may be bundled, palletized, or similarly grouped for efficient handling.

The business intelligence system uses commercially available business intelligence tools to process requests from a user, termed transaction requests. While it may be necessary to define the nature of the information processed and nature of the information sought when using such business tools, there is no need to actually develop or describe the internal operation of the business tool itself. The principles and operation of the present invention can be appreciated without an understanding of the internal operation of the business tool software package.

Transaction requests involve at least one shipping location, whether the location be the origin or destination of an item shipped. Transaction requests may involve information based on a plurality of shipping locations. The user must be 'affiliated' with a shipping location in order to obtain shipping level specific information regarding the shipping location and must be further authorized to access the account. 'Affiliated' with a shipping location requires the user to be an originator or receiver of the shipped item, or associated by corporate structure or business agreement allowing access to such information. A business cannot obtain shipping information of a business competitor absent an agreement allowing such access. This access is indicated in the user profile database.

Data resulting from a transaction request is referred to as the transaction result and is provided in different formats. The transaction result may comprise retrieval of data for the recent past, such as the previous week or month. Shipping information pertaining to a previous week or month can be considered 'current' shipping information, whereas information pertaining to the distant past, e.g., last year or previous quarter, may be considered 'historical' shipping information. The degree is relative, and the user or system provider may define various time periods as 'current' and 'historical,' or may simply define all such data as 'shipping data.' Demarcation of 'current' and 'historical' data is a specific implementation aspect.

A user may request comparison of current and historical shipping information for a given location(s). For example, the user may request comparison of parcel shipping volume in the current month with the number of parcels shipped in the same time period in the prior year.

In addition to retrieving historical information, the system can extrapolate or forecast many of the variables for which shipping data can be requested. The user defines the time period for which extrapolation is computed and the system uses one of the many well known mathematical methods to extrapolate the data. For example, data indicating monthly volume of parcels shipped over the previous 12 months can be used to extrapolate anticipated volume of packages shipped in the next six months. Obviously, the confidence level of extrapolated data diminishes the farther in time the data is extrapolated.

In addition, the transaction request may include a parameter used to modify the data obtained from the shipping information database. This allows formulation of a 'what-if' analysis called a speculative transaction request. For example, a user may ascertain the historical shipping volume and future trends associated with a specific transaction request. The user may desire to compare this data with a similar analysis that increases the growth rate by an additional 10%. Various parameters can be indicated to modify extrapolated data, such as increasing volumes at certain locations while decreasing volumes at other locations. This 'what if' analysis would be used to ascertain the shipping impacts of closing one distribution center and shifting the volume to other distribution centers.

The aforementioned capabilities provide historical and current data, and future trends, based solely on shipping data collected by the shipping provider. The business intelligence system enhances the utility of shipping data by allowing users to augment the database. The augmented data is communicating by using for example, an electronic data interchange (EDI) interface between the customer and shipping provider. EDI is used to electronically transmit a manifest and allows the shipper to easily provide additional information pertaining to the shipment. EDI often is associated with specific protocols and procedures, and other communication methods may be used to transmit such information between the customer and shipping provider, such as, but not limited to, various protocols used with the Internet, including HTML, XTML, File Transfer Protocol, or any other protocols developed using Internet. Other examples include X.25, frame relay, ISDN, dial-up telephone access, wireless data packet services, private dedicated facilities, asynchronous transfer mode, or various wide area networks or local area network standards. The shipping information is retained by the shipping provider and can be used in analyzing transaction requests. For example, the shipper may indicate how many units are contained in each shipped parcel, the inventory identifiers, and value. This information allows additional analysis of shipping information. For example, denser packaging techniques may result in fewer parcels being shipped, while increasing the number of items contain in the parcels actually shipped.

The aforementioned capabilities may be further modified to consider non-shipping related data in the form of statistical data, which can be embodied in various forms. One form is demographic data based on geography and includes economic demographics, economic growth indices, and population increases as defined a specific geographic area. The area defined for a zip-code, city, county, counties, state, several states, or national basis. Many other examples demographic data are possible, but are not listed.

Other statistical data includes corporate financial related information such as provided by Dun & Bradstreet providing credit and financial information regarding corporate business entities, or databases providing geotype or industry segmentation data. Other statistical databases provide specialized economic data, such as product classification based on SIC (standardized industry code) or comprise government databases including databases containing census, regulatory, or securities data.

The examples disclosed herein are only a few of the possibilities of statistical databases that may be compiled, leased, or bought which can be used in conjunction with comparison of shipping data. The scope of such data encompasses any database in which comparison with the transaction results provides additional insight into the meaning of the transaction results.

Architecture Overview

Figure 1:
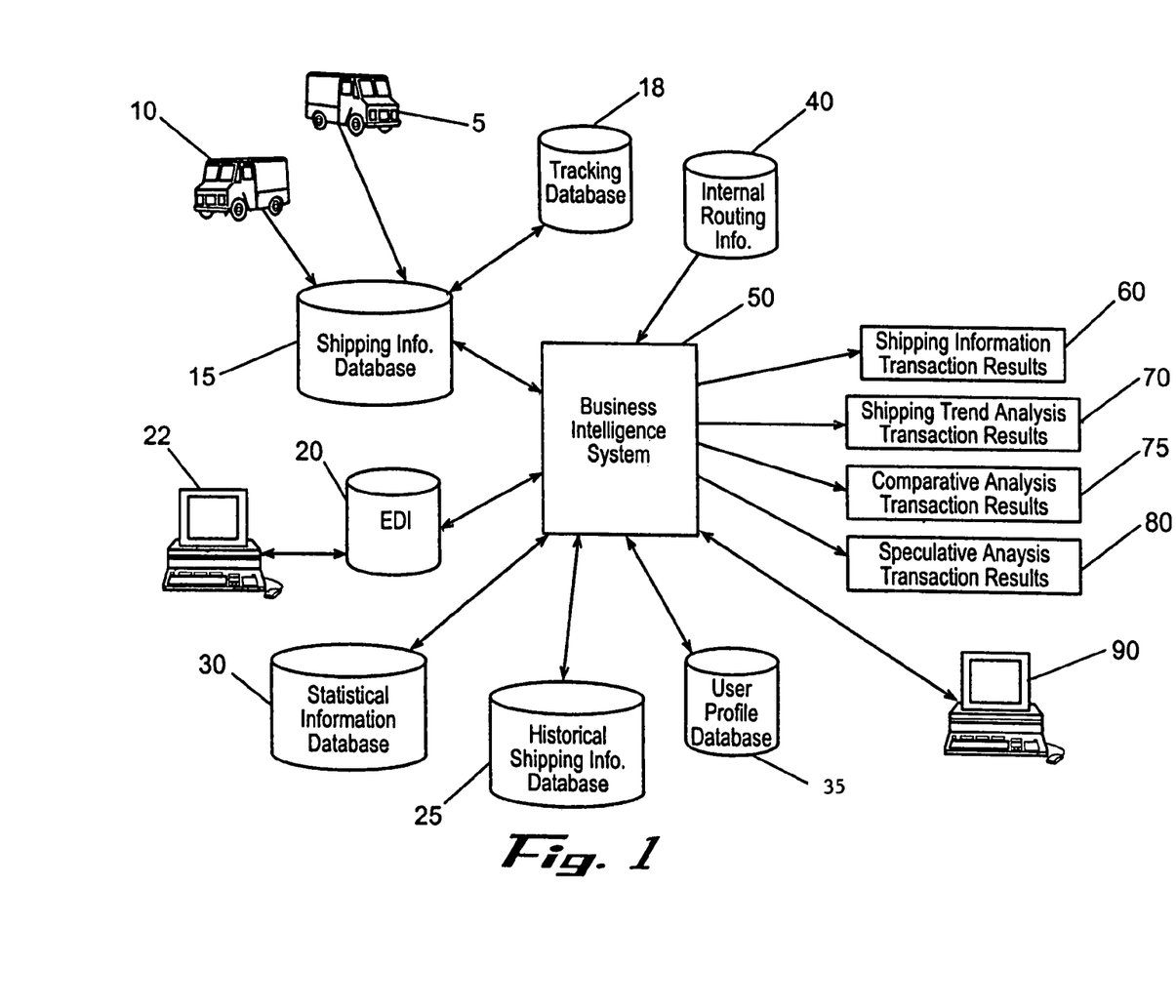
FIG. 1 depicts one embodiment of the overall operation of the business intelligence system according to the principles of the present invention.

Turning now to FIG. 1, one embodiment according to the principles of the current invention is illustrated. It is evident that other architectures and methods of implementation are possible, and FIG. 1 is not intended to limit a business intelligence system to any one architecture. A current shipping database 15 maintains shipping information. The business intelligence service provider defines the database to contain shipping information associated with the current week, month, year, or any other timeframe. The database is populated using shipping data associated with parcel pickup activities 10 and parcel delivery activities 5. It is not a requirement that the business intelligence provider operate a shipping service, but may coordinate data collection with a shipping service, or with a plurality of parcel origination and destination locations. While not all originators or receivers of parcels are users of the business intelligence system, each business intelligence system user is affiliated in some manner with an originator or receiver of parcels. For example, the user may be a corporate affiliate (e.g., parent company) of various retail business locations accessing shipping data associated with the retail business locations.

The pickup and delivery information may be collected in real time by carrier personnel and using portable computers for recording and communicating the information. One such description of a system tracking parcel delivery is described in U.S. Pat. No. 6,285,916, entitled Multi-Stage Parcel Tracking System. Alternatively, the shipping data could be entered manually into the system on a daily basis. Once entered, the shipping information is immediately available for analysis after stored in the shipping information database. After a certain period of time, as determined by the shipper, the information may be moved to a historical shipping information database 25 that is a more economical long term storage database. The distinction between current and historical shipping data is not required, but reflects one embodiment of the present invention. The business intelligence system may limit historical data to a certain period, as the value of the data diminishes with age and storage costs increase as well. Other embodiments may chose to aggregate all shipping information data in one database, or further segregate data into different categories of storage, such as segregating the data based on calendar year. The business intelligence system logically views the current shipping database 15 and historical shipping information database 25 collectively as one logical database that may be implemented in several physical storage units.

The shipping information database may be updated with a parcel's immediate location and/or status information during handling by a carrier. As the parcel is transported from one routing facility to another, loaded and unloaded onto vehicles or aircraft, a parcel identification number can be used to as an index for providing tracking information. The tracking engine responds to tracking requests by accessing the shipping information database 15 and analyzing information necessary to respond to the tracking request.

The shipping information database may be augmented with information from the shipper using an EDI interface 20. Data is provided using computer 22 using the appropriate Electronic Data Interchange standard for electronic communication of a manifest to the carrier. The originating shipper may indicate optional information in the manifest related to the shipment which is not required by the carrier for handling the parcel. For example, information provided with the manifest may indicate how many units are contained in each parcel, their inventory numbers, and value. This information is received by the carrier and associated with the item in the shipping information database 15. Other computer systems may be potentially involved in processing EDI data, but are not shown, and their operation are not necessary for understanding the present invention.

In addition to the shipping information database 15 and the historical shipping information database 25, the business intelligence system 50 accesses a user profile information database 35, the internal routing information database 40, and the external macro economic database 30. These databases are shown separate from the shipping database, but may be integrated in alternative embodiments.

The user profile information database 35 contains information specific to the user of the business intelligence system, such as security authorization information. Security authorization information pertains to user access authorization such as user identification, passwords, encryption methods, allowable methods of access, and maximum number of simultaneous users. The methods of access may include dial-up modem access, X.25 access, or internet access. Each access method may have unique security aspects defined. For example, dial-up access for a user may be correlated with a specific calling telephone number, while internet access may be restricted to using certain encryption mechanisms. One use of the security authorization information is to ensure that only authorized users access the system.

The user profile information database also indicates the authorized service levels defining which services a users is authorized to access. Different service levels may reflect differing capabilities of accessing statistical databases, pricing levels, and computational resources required to process a transaction request. One embodiment of the invention is that various service capabilities are provided based on a subscription level selected by the service. Since certain transactions are processor intensive, service levels may restrict users to those transactions which the user is willing to pay for.

The user profile information database also contains user shipping location information. This information identifies various locations associated with a given user. For example, shipping locations may represent retail stores under common ownership of the user. Each shipping location may represent the originating point of a shipped item, the destination point, or both. Any of the shipping locations associated with a user can be the focus of a specific business intelligence query; however a user cannot obtain specific shipping information for locations not listed in their profile. The user may also categorize shipping locations in a common geographical area, such all location within defined cities or states, or may segregate the locations based on primarily receiving or originating shipped items. Since this information is defined on a user basis, this information is stored in the user profile database and not in the shipping database.

Finally, the user profile information database contains service template information. As will be seen, business intelligence systems provide flexibility as to configuration, data analyzed, locations analyzed, and how the information is to be presented. The business intelligence system of the present invention provides such flexibility, among other aspects, as to the inputs used in a transaction, the nature of the information to be extracted, the period for which information is sought, and the format of the presentation of the data. Once a user establishes the desired parameters for processing and presenting a transaction, these are maintained in the user profile database for future use, avoiding tedious replication of parameters in commonly executed transaction requests. For example, a user may monitor certain aggregate information for all their shipping locations as well as specific information for a subset of shipping locations. Rather then identifying the same parameters each time information is desired, the user defines a service template for future transaction requests.

The internal routing information database 40 provides information to a user so that they may perform planning of alternative shipping decisions. In this instance, aggregate shipping information which is not associated with a user's shipping location is used to provide typical shipping related information. For example, a user may consider relocating distribution centers to a new location. In this case, there will not be shipping data in the shipping information database reflecting the proposed location because the user has not shipped any packages from that location. However, the business intelligence system can access other shipping information to provide an expected typical shipping time. The transaction request requires analyzing the anticipated average delivery time and costs from the new location and comparing it with the delivery times from the users old locations. This 'what if' planning allows a user to examine the impact of various shipping alternatives for locations in which user shipping data is existing. In no circumstances, does the user have access to another's specific shipping data that is individually identified as such.

Finally, the business intelligence system 50 accesses a variety of 'statistical' databases 30 comprising macro-economic, corporate affiliation, demographic, or cartographic data. Such databases are available from private information service providers (e.g., Dunn and Bradstreet, Westlaw) or governmental databases (census, securities and financial information databases (e.g., EDGAR), and economic indicators). The information includes demographic indexed by geography, economic data indexed chronologically or by industry segment, or economic growth factors geographically defined.

One embodiment uses Dunn and Bradstreet® databases, such as the Commercial Credit Scoring Report™ database predicting the likelihood of a business's payment delinquency. Information on a specific company can be combined with certain shipping indicators, such as claims for lost or damaged parcels, as a signal to potentially alter shipping patterns or other business practices. Another Dunn and Bradstreet® product incorporates the D-U-N-S® number uniquely identifying a business in the Family Tree® Finder database. Given a D-U-N-S® number, any other affiliated businesses can be readily identified and their relationship ascertained. This can be used for identifying potential business opportunities affiliated with current clients.

Another embodiment uses cartographic maps for displaying location information. This utilizes a geographic database of maps available from a variety of providers, such as MapQuest® or MapInfo®, so that locations and associated shipping information is graphically displayed. The regions displayed may be within a city, state, or plurality of states. Other embodiments in accordance with the invention may display shipping information within a country, group of countries, or continents. Many other types of commercially available databases are possible, and the listing of the aforementioned databases is not intended to be exhaustive or limiting.

Database Structures

The Shipping Information database comprises two main categories of information: the Originating Parcel Shipping Information and the Destination Parcel Shipping Information. Other embodiments of the database structure are possible, and this represents one illustrative embodiment. In the illustrative embodiment, the Shipping Information database 15 indexes all information according to a parcel identifier.

Originating Parcel Shipping Information contains information obtained at parcel pickup. All the information normally obtained at the parcel's origination point is stored in a record, and indexed with a unique identifier, such as a tracking number. The information typically pertains to the originating entity, including name, address information, and user identification. Information pertaining to the parcel, such as weight, tracking number, service level, pickup data and time are also recorded. Typical information comprising the Originating Parcel Shipping Information is shown in Table 1, but the table contents are exemplary and those skilled in the art will recognize that other information may be recorded and used for processing transaction requests. For example, parcels delivered to foreign countries require additional address information (e.g., province or locality designation); parcels may also include a telephone contact descriptor associated with the destination party, third party billing information, hazardous material indication, et cetera. However, it is not necessary to delineate each information field and its usage to illustrate the function and purpose of the shipping information database.

TABLE 1

| Originating Parcel Shipping Information Database Contents | |
| --- | --- |
| Parcel Identification Number | Destination Party's ZIP |
| Originating Party's Company Name | Originating Party's Name |
| Originating Party's City | Originating Party's Address |
| Originating Party's ZIP Code | Parcel Weight |
| Time of Parcel Pickup | Date of Parcel Pickup |
| Accepting Employee's Name | Location of Parcel Pickup |
| Parcel Service Level | Destination Party's Name |
| Destination Party's Company Name | Destination Party's Address |
| Destination Party's City | Destination Party's State |

The Originating Parcel Shipping information may be collected in a variety of ways. The information may be handwritten on a form and collected by the driver at parcel pickup and manually entered into the shipping database. The driver may use a handheld portable computer for entering the data that communicates shipping data to the shipping information database. Alternatively, the originating party may have entered the information electronically by accessing a web site provided by the carrier or using other EDI mechanisms. Or the originating party may use the services of a third party agent collecting and communicating the shipping information to the shipper. Various methods may be used to obtain the originating parcel shipping data in keeping with the principles of the present invention.

After the Originating Parcel Shipping Information is obtained, the parcel is then processed and appropriately routed to the destination shipping location. During the course of handling, the carrier may process the parcel at a variety of routing hubs and transport the parcel by various transportation modes. The carrier may elect to track the parcel along the various locations using the tracking identifier, record the parcel's loading and unloading, and store the status/handling information in the shipping information database.

Upon delivery, Destination Parcel Shipping Information is obtained. This information may be stored as a separate database indexed by the parcel tracking number, or may be integrated with the Originating Parcel Shipping Information into the Shipping Information database 15 as shown in FIG. 1. An important category of Destination Parcel Shipping Information obtained is the date and time of the delivery as shown in TABLE 2. Other information may be collected and stored including name of recipient accepting parcel, name of delivery-person, and condition of parcel upon delivery. The illustrative list is not intended to be exhaustive or limiting.

TABLE 2

Destination Parcel Shipping Information Database Contents

| | |
|---|---|
| Parcel Identification Number | Time of Parcel Delivery |
| Date of Parcel Delivery | Delivery Driver's Name |
| Signature of Accepting Person | Condition of Parcel |

Business Intelligence Processor Operation

Figure 2:
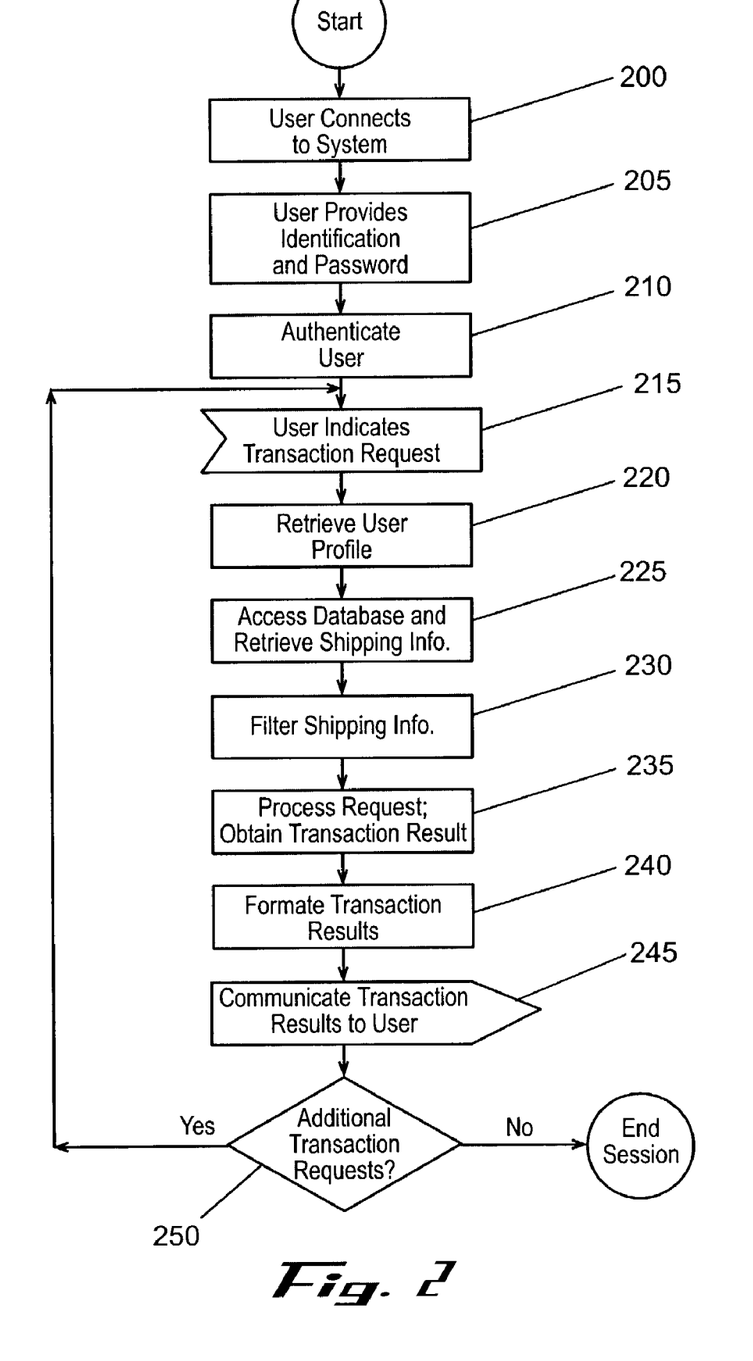
FIG. 2 depicts an illustrated embodiment of the overall processing steps of the business intelligence system according to the principles of the present invention.

FIG. 2 illustrates a high level process flow of the business intelligence system. The process begins by the user establishing communication with the system in process 200. Access may be by any variety of means, including internet, dial-up telephone lines, private line, X.25, or other data services known to those skilled to the art. The user next enters identification and authentication information 205 which the system uses to identify the user and verify that the user's identity. Typically, a username is entered to identify the user and a password is used for authentication. However, there are many other security measures that may be used, many of which are more sophisticated, but each keeping in accordance of the present invention. The business system authenticates the user 210 and proceeds to obtain the user service profile 215. The business intelligence system retrieves the user specific location data, authorized service levels, and service template data which are all used in processing transaction requests from the user. The system is then ready to accept a transaction request from the user 220. Transaction requests can be of several types as discussed below. After determining the type of request made, the system determines what shipping data is required and retrieves the shipping data from the current or historical shipping information database.

The next step 225 requires identification and retrieval of the user data from the appropriate databases primarily from the shipping information database. The next step 230 requires filtering the pertinent data so that only data pertinent to analyzing the request is retrieved. Next, the data is processed 235 and the results communicated to the user according to the format specified in the user profile 245. At this point 250, the user may initiate another transaction request or terminate the session.

Types of Transaction Requests

The user can request several types of transaction requests. Each transaction type results in certain results and allows a user to retrieve data, compare data, extrapolate upon the results, and compare the results with other statistical (non-shipping) data. The system is flexible as to the format in which the results are presented.

Shipping Information Retrieval

The Shipping Information Retrieval transaction request retrieves shipping data for items previously delivered. The system retrieves information as specified for a given time period and for specified locations. The shipping data may be retrieved from the shipping information database, the historical shipping database, or both. Illustrative shipping parameters that can be retrieved in one embodiment of the present invention are shown in Table 3.

Selective Results from Shipping Information Transaction Result

TABLE 3

Number of Parcels Shipped Overall
Total Billed Amount
Billed Amount per Service Type
Billed Amount Average per Parcel
Parcels Sent Again
Average Weight per parcel
Average Weight per parcel per Service Type
Parcels Shipped per Service Type
Parcels Claimed Damage by Recipient
Parcels Lost The parameters shown are for illustration only and their meaning is self explanatory. It is possible to augment the list with many more parameters, such as average delivery time per package, average delivery time per package per service type, et cetera. Table 3 illustrates one embodiment and many other combinations of parameters can be requested/indicated in accordance with the principles of the present invention.

The desired parameter is selected by the user. The resulting number may be indicated in absolute or relative terms. Absolute terms provides an absolute numerical quantity, such as number of parcels shipped. Relative terms describes the resultant value as a percentage, for example, the percentage of total parcels which are sent again. The relative terms are particularly useful for comparing relative changes from one time period to the next. It is possible to provide both types of results to a user for a set of historical shipping data. The units associated with each parameter may be fixed in the system, such as type of currency or standard for indicating weight.

The user indicates the locations for which the information is to be filtered. The location may be explicit, or may be implicit in which case it has previously been indicated.

The user also indicates a time period for which data is retrieved. Since a carrier may store shipping data for many years, the time period limits potentially resource intensive transaction requests. Illustrative time periods of one embodiment of the present invention include: daily, monthly, quarterly, or yearly.

Typically, data pertaining to 4-10 time periods are typically shown to the user when presented in a graphical form (e.g., pie or bar chart). If presented in a text (tabular) form, then the user may specify any number of time periods.

Trend Analysis Transaction Request

The user can also request a trend analysis transaction. A trend analysis incorporates data from existing or historical shipping information and extrapolates (or forecasts) the data into the future. It allows forecasting most of the data that can be retrieved from the Shipping Information Transaction Request. The trend analysis transaction essentially uses various statistical modeling tools for extrapolating data. The trend analysis request operates using shipping information and does not require access to any of the information in the statistical databases. Most, but not all of the parameters derived from the shipping information database can be extrapolated. Parameters such as past shipping volume can be used to forecast future shipping volumes. However, shipping information indicating the locations from which parcels are shipped (e.g., in cities) does not provide any for extrapolating which locations (e.g., cities) would be served in the future. (Note, however, that selection of new shipping locations can be performed using the speculative transaction request discussed below.) The user must indicate which parameters are to be extrapolated and a time period for which extrapolation is desired. The indication of such parameters may be explicit in each transaction request, or can be implicit by using a default value indicated in the user profile.

Comparative Analysis Transaction Request

The user can indicate a comparative transaction. A comparative transaction request is essentially two shipping information requests with at least one different variable. The utility of the transaction analysis is enhanced by allowing comparison with another result representing using a varying parameter. For example, one common application is to compare the same shipping history variable for two different locations. Other comparative transactions, for example, can display the total parcels sent over time and the average weight per parcel over the same time period.

In another example, two similar transaction requests are made requesting the same type of parameter. For example, a user may wish to compare shipping volume from two different time periods involving the same origination/destination locations. Or a user may wish to compare average shipping charges for parcels shipped from the same location, but to two different destination locations. Both of these illustrate a comparative transaction request involving two Shipping Information Transaction Requests.

In another form of comparative analysis, the transaction typically incorporates disjoint transaction types, such as comparing either a shipping transaction in conjunction with data from one of the statistical databases. This allows a comparison of information derived from shipping information with one or more other economic or demographic based information. For example, a user may desire to compare shipments from retail stores in a region with the regions average population growth. Specifically, comparison of the two disjoint parameters may show a correlation between the two. For example, if retail shipments to regional stores increased 3% over the previous year, but the population for that region increased 5% over the same period, this may indicate a potential decrease in relative market share.

Speculative Analysis Transaction Request

Finally, the user can request a speculative analysis transaction request—this allows a 'what-if' type of analysis. This transaction request is a variation of a combination of a trend analysis and comparative analysis requests. The user may select a form of trend analysis, but indicates a parameter that modifies the trend or comparative analysis. Alternatively, or in combination, the user may indicate a parameter replacing a parameter. For example, a user may desire to study shipping charges associated with an originating and destination location. A trend analysis can be performed extrapolating charges in the future associated with the two locations. However, additional insight may be obtained by instructing the business intelligence system to override certain parameters. For example, the user may desire to indicate a fixed percentage increase in the growth volume year-over-year. The system calculates the extrapolation incorporating the parameter and displays the result along with extrapolation without the parameter.

Another example involves analyzing alternative transportation and distribution schemes. A user may examine their current distribution network for a plurality of distribution centers (i.e., package volumes, shipping costs, destinations) and compare the same parameters with different locations for their distribution centers. The system will extrapolate by analyzing data from other users and aggregating the data to provide typical values representative of the hypothetical situation. The Speculative Transaction Analysis Request allows easy comparison of what currently or projected shipping based information with comparison of hypothetical alternatives.

Transaction Request Presentation Formats

Transaction requests may be presented to the user in a variety of formats. The preference of the user is stored in the User Profile Information database, and can be changed by the user at any time. The preference used may be explicitly indicated in the request or may be implicit from values stored in the user profile. The main types of presentation formats include text, graphical, cartographical, and applet.

Figure 7:
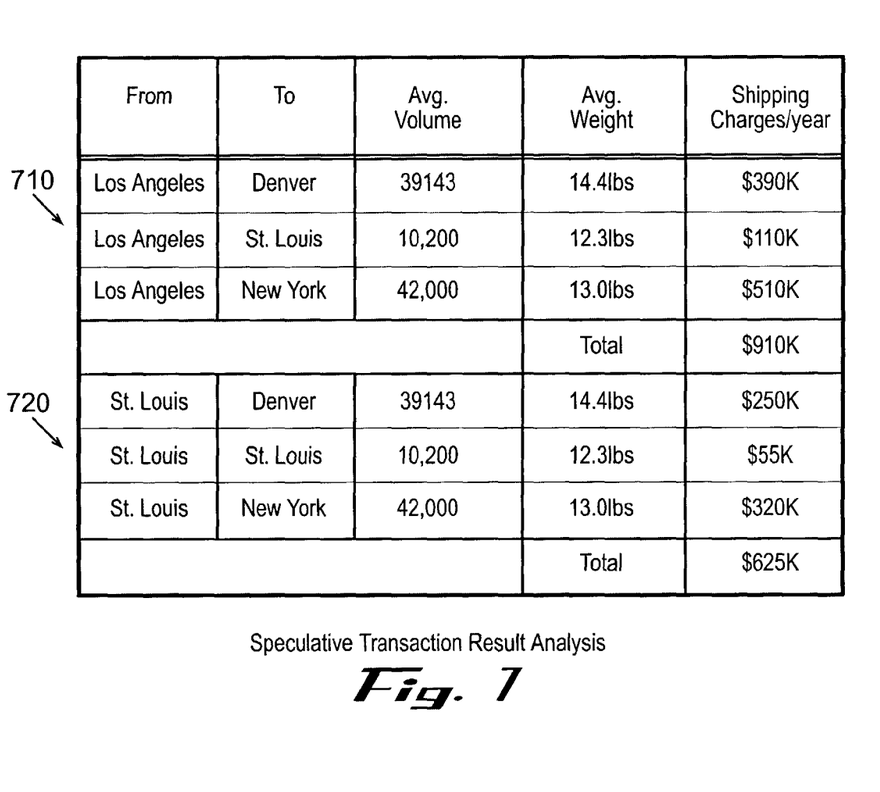
FIG. 7 depicts an illustrative transaction result display trend analysis data based on shipping volumes in a comparative text-based table.

Text format consist of a tabular format using alphanumeric characters. Arranged in a columnar format, data for various indices is present associated with a given location over a given time period. An example of this form of output is depicted in FIG. 7, which is discussed below. This format has the advantage of providing specific numerical data. A variation of the text or tabular presentation format is a flat text file where tabs, spaces, and other formatting characters are removed to facilitate loading the file from the client computer operated by the user to a standalone applications, such as a worksheet application.

Graphical formats transform the numerical data into chart form. The most common forms of graphical formats are line charts, scatter charts, pie charts, and bar charts, although other variations are possible and are not intended to be excluded. These typically are used represent a variable over time for a given location. While visually appealing, such charts are limited as to the number of data points and level of specificity that can be provided. Graphical presentations allow convenient comparison of two transaction results, as well as providing a clear demarcation of existing data from extrapolated data.

Cartographical formats allow convenient display of data associated with a geographical location, which is often the case with location based information (e.g., cities to which shipments are made). Cartographical formats frequently depict city locations in a state, with a plurality of states displayed. However, some embodiments of the present invention may display entire countries when transaction requests are based on analysis of international locations, or locations within a city.

Finally, the applet format comprises data in conjunction with software instructions, such as a JAVA based script, which are communicated to a user and processed on a local computer for display. Such applications may be used in conjunction with internet access providing a flexible arrangement of processing data partially in the business intelligence system and partially in a locally based computer system.

The aforementioned formats illustrate only a few embodiments of the present invention. Other formats and variations of the above may be used according to the principles of the invention.

Business Intelligence Software Tools

The business intelligence system comprises a business intelligence software tool readily available from commercial providers. One such business intelligence tool is the Series 7 products from Cognos Corporation that can extract, transform, and load data from various databases, analyze, and report results. Other applications such as IBM's Visual Warehouse™ provide similar capabilities. Those skilled in the art will appreciate that various tools, including existing business information tools, can be adapted for processing the information as indicated.

Illustrative Transaction Types and Transaction Results

The number of possible permutations of transaction types for specific parameters in various formats is virtually unlimited. Several examples are presented detailing the various transaction types and presentation formats, and illustrate a few of the many possible embodiments of the present invention.

EXAMPLE 1A

Shipping Information Retrieval

Figure 3:
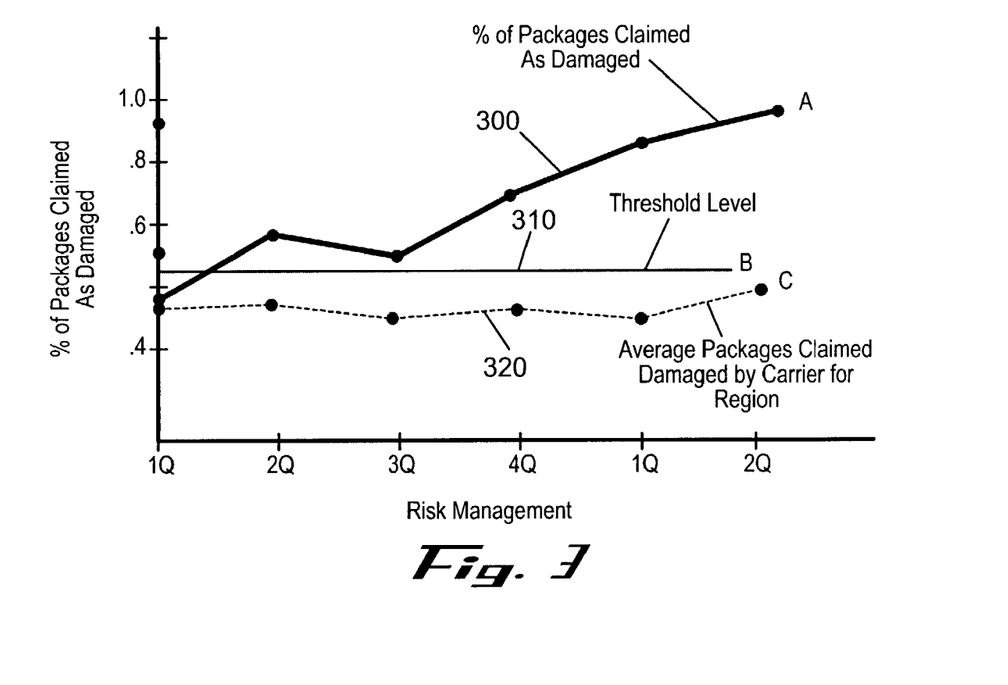
FIGS. 3-3c depict illustrative transaction results displays.
Figure 3A:
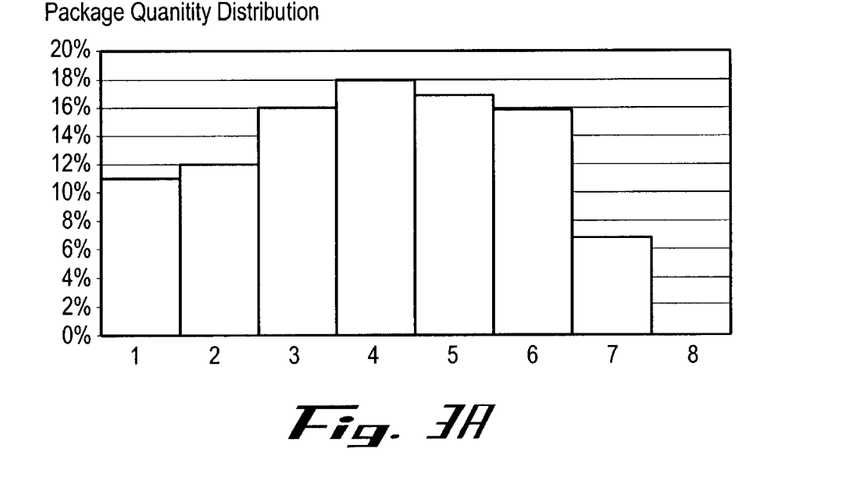

A basic capability of the system is to retrieve past shipping information. FIG. 3A illustrates one embodiment of information retrieval showing a histogram of the number of packages shipped. This is expressed as a percentage of the average number of packages shipped from a given location(s) over an indicated time period. For example, FIG. 3A indicates that about 11% of the parcel shipped from a given location over a given time period were shipments of a single parcel while 12% of the shipments involved two parcels.

Figure 3B:
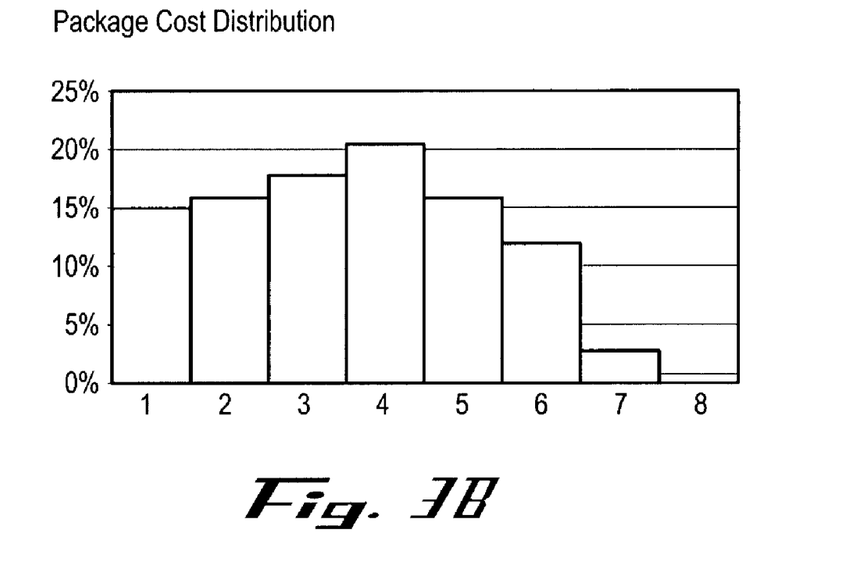
Figure 3C:
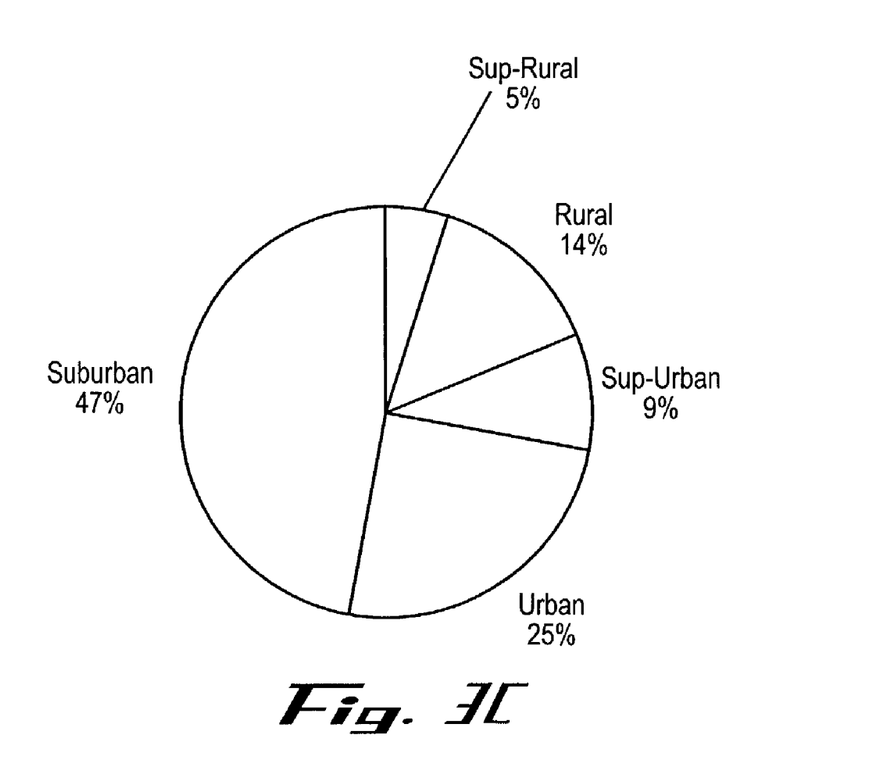

Similarly, FIG. 3B illustrates a histogram of a user's shipping costs over a indicated time period (typically on an annual basis) indicating that 15% of the shipping costs are incurred in conjunction with shipping a single parcel. The information can be displayed in a variety of presentation formats. For example, FIG. 3C illustrates another format, a pie chart, illustrating the urban characterization of the destinations for parcels shipped. The results are displayed as percentages of parcels shipped with certain characteristics. In this example, the destination zip code is analyzed with respect to a geo-type indicator database. This illustrates the application of non-shipping data (e.g., a geo-type database of zip codes) analyzed in conjunction with shipping information (e.g., destination zip codes). This same format could illustrate other aspects associated with the destination of a parcel. For example, by associating the destination address with an external database, such as the type of business or industry segment, the graphical display can illustrate various standard industry segments associated with the destinations of the parcels.

EXAMPLE 1

Claim Rate Analysis

One application of the Shipping Information Business Intelligence System is to identify potential fraud scenarios. While use of a tracking number for each parcel has reduced the incidences of fraudulently claimed lost parcels, claims of damage to the contents of a parcel are difficult to verify by the sender. Such claims may be indicative of fraud by the recipient, abuse of items by the carrier during shipment, or improper packaging of the product by the sender. Thus, there is a motivation for the shipper to verify which party is responsible for the alleged damage of the parcel's contents.

One method of identifying potential false claims involves examining carrier's claim rates. Examining FIG. 3, Line A 300 depicts the percentage of parcels delivered from the originating location to the destination location in which claims have been made. In this instance, the presentation of shipping information is in percentages, rather than absolute numbers to facilitate comparison. As depicted, the percentage is increasing, particularly over the last three quarters. Such information by itself is useful, but its utility can be enhanced by comparing it with the average claims made to the carrier in the same geographic region with Line C 320. Since Line C is stable over the same time period, it highlights an unusual situation in which claims made between the originating location and the destination location are not representative of other packages shipped between the two locations. Line B 310 indicates a threshold level which the user can set which triggers the system to automatically notify the user of unusual conditions relating to damage claims.

The increased claim rate can be due to a variety of factors, such as poor packaging or carrier abuse. If the claims rate of other packages sent between the two areas does not have a similar elevated claims rate, then it discounts abuse by the carrier. If the originator is sending similar products to other locations, then a comparative claim rate with another location can be performed. Presumably, if the same type of packaging is used in all shipments, an increased claim rate for one location would also be reflected in shipments to other locations. In this manner, an abnormal claim rate can be isolated as to the responsible party between the sender, carrier, or recipient.

The user may be able to compare their own specific shipping data with aggregate shipping data maintained by the shipping carrier. For example, in the preceding example, as user is able to compare their shipping information with aggregated shipping information of others. In such cases, the other shipping data is anonymous, so that individual shipping data is kept private. If the transaction results (in the aggregate) indicate a higher-than-average claim rate for a particular destination, then this appears to discount incorrect packaging as being responsible since other packages reflect a higher claim rate as well.

The aggregate data maintained by a carrier may be further segregated by industry segment. For example, classification codes based on standard industry codes (SIC) may be utilized to classify shipping data among industry segments. Providing that the shipping carrier maintains a sufficient number of customers and a sufficient volume of shipping data so that it is not possible to isolate any particular customer's individual data, the system allows a user to benchmark their shipping data with that of other industry segments.

EXAMPLE 2

Comparing Disjoint Parameters

Figure 4:
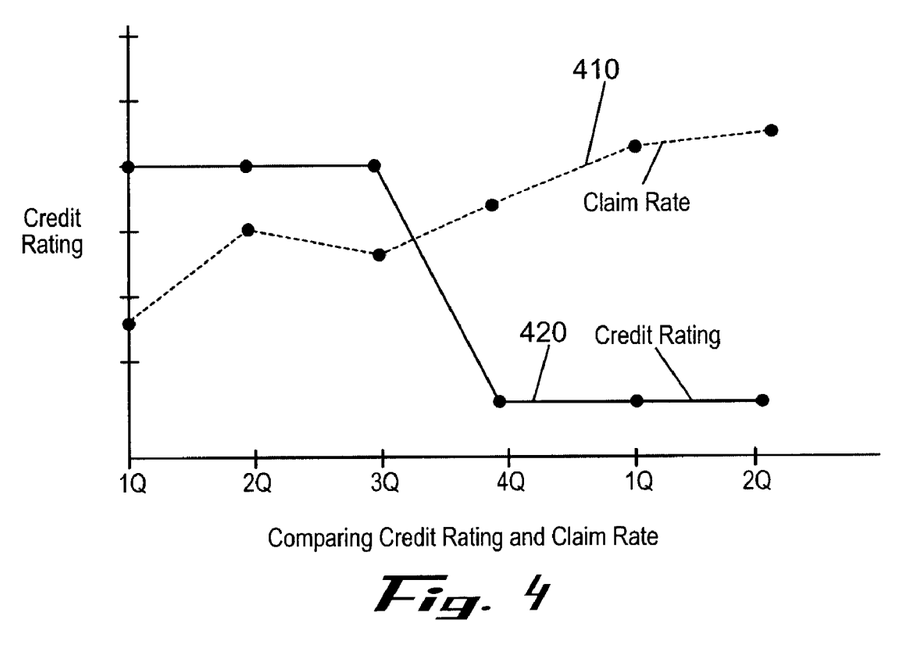
FIG. 4 depicts an illustrative transaction result display comparing packages claim rate and credit rating over time.

FIG. 4 builds upon the previous example and illustrates comparing two different parameters. Once an abnormal claim rate is identified and tentatively determined that the carrier and shipper is not responsible, statistical data may be used to identify whether the receiver may has any motivation for issuing the higher than normal damage claims rate. Line A 410 depicts the claim rate and Line B 420 depicts the credit rating of the receiver as derived from an statistical database providing credit rating information. The coincidence of the increased claims rate and the decrease in credit rating may indicate a deteriorating financial condition providing a motivation of fraud. While such comparisons may not be determinative of the cause of such problems, they may nonetheless be deemed useful by users.

EXAMPLE 3

Identification of Shipping Volume Growth

Figure 5:
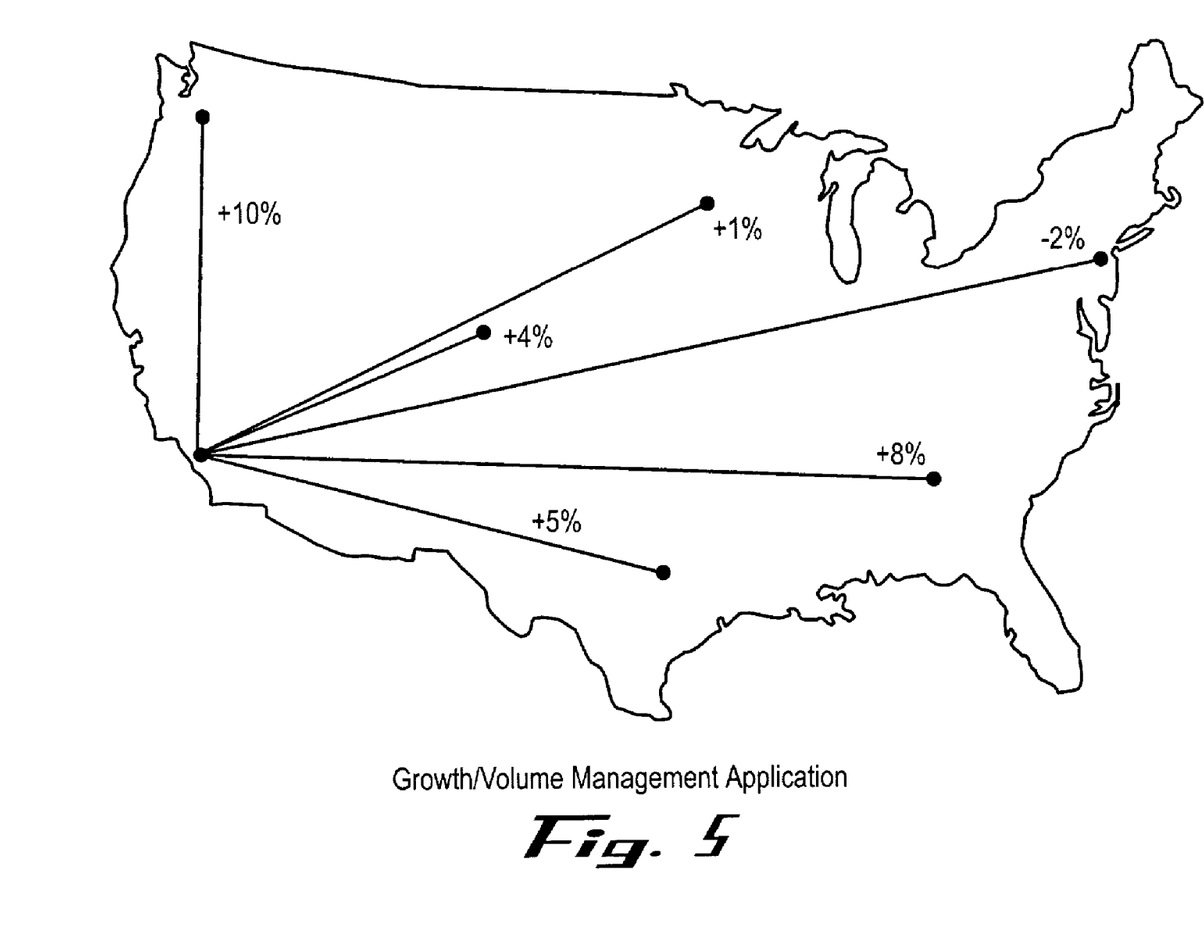
FIG. 5 depicts an illustrative transaction result display growth rates using a cartographical map.

Identification of changing shipping volume can be useful a variety of reasons, including planning for the placement of new distribution centers, indicating which markets are developing faster than others, or identification of less expensive transportation means. In FIG. 5, a transaction result illustrates comparative shipping volumes for a year-over-year period for a plurality of cities. This depiction illustrates comparative results by calculating the year-over-year difference, and only indicating the difference as a percentage from the previous year. An alternative method of presentation involves displaying each year's numerical shipping volumes on a map.

The results of FIG. 5 could be presented in tabular form retrieving average volumes, weights and total costs for items shipped from Los Angeles to the indicated destination cities. The information could also be provided in a tabular form devoid of formatting, spaces, tabs and the like and communicated as a flat file to a user's computer. The user could then load the data into a locally executed spreadsheet application, and further process the data.

EXAMPLE 4

Marketing Application—Identification of Potential Customers

Figure 6:
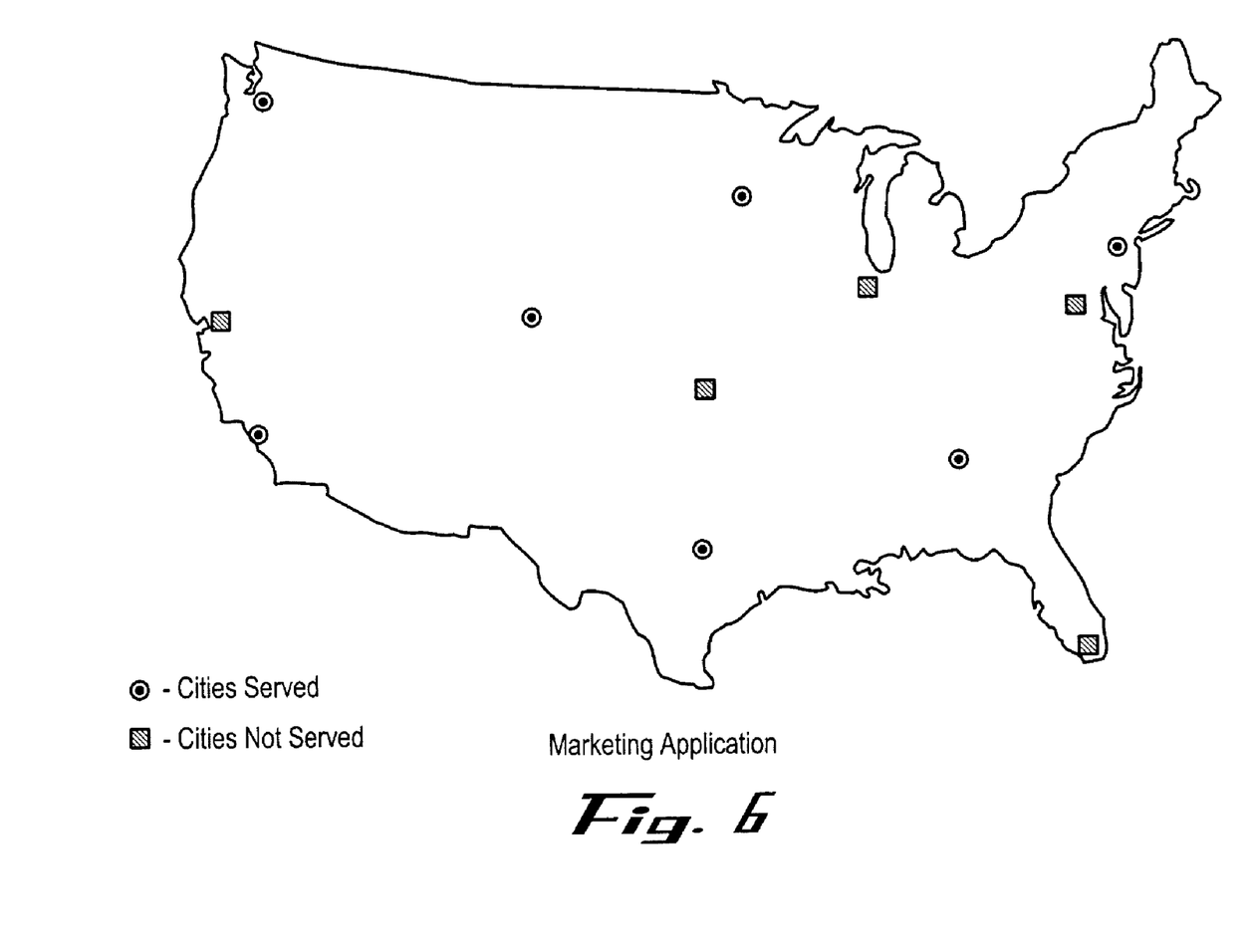
FIG. 6 depicts an illustrative transaction result display locations served using a cartographical map.

Frequently a vendor will ship items to specific business locations of a client, but the vendor is not always aware of other business locations associated with the client. This is often the case in growing markets, or when markets outside of the region are developing. FIG. 6 represents a cartographic display of client locations based on existing shipping destinations. This represents a comparative analysis transaction request in which the first request is a shipping information request regarding destination locations to which items have been shipped. The transaction results are presented in a cartographic form comprising a grouping of states (the continental U.S.). The results are then compared with another transaction request directed to using the statistical information database comprising Dun and Bradstreet D-U-N-S® number to identify affiliated business locations. Using the Family Tree® Finder database allows identification of all affiliated businesses using a D-U-N-S number, and the business intelligence system maps those locations on the same map with the first transaction request. In this manner, the user is presented with a graphical analysis of current and potential shipping locations.

EXAMPLE 5

Distribution Analysis

FIG. 7 illustrates the application of a speculative transaction request type in considering the relocation of a distribution warehouse. The top half of the table 710 illustrates current annual volumes of shipments from the Los Angeles location to various destination locations. The system retrieves shipping information for those destinations based on number of parcels, average weight and cost, and displays the values in text (tabular) form.

The bottom portion 720 displays the results of another transaction request, where the variables are the same, except that the user selects a parameter (e.g., originating city) that replaces the original value used in the first request. In the illustrated embodiment, the user indicates St Louis as a replacement parameter. The business intelligence system uses the same volume and average weight of the parcels, but instead calculates shipping costs based on tariff tables available in the internal routing information database. The results of the lower portion of the table 720 does not represent the user's actual shipping data, but rather hypothetical shipping data based on shipping data from Los Angeles. The results are provided in tabular form allowing the user to compare actual shipping costs with speculative shipping costs based on an alternate point of origin.

As evident from the above examples, a variety of past, current and future shipping data can be compared with similar data or disjoint statistical data and presented in a variety of formats. The above examples show only a few of the many possible combinations and are not intended to be limiting or exhaustive of the combinations. Many modifications and other embodiments of the invention will come to mind to one skilled in the art to which this invention pertains having the benefit of the teachings presented in the foregoing descriptions and the associated drawings. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A computer-implemented method of facilitating a determination, by an entity, of which supplier to use to supply a particular type of item to a particular destination, said method comprising the steps of:

receiving and storing, in memory of one or more computing devices, a plurality of shipping records associated with a plurality of parcels that have been previously shipped from a particular carrier, each of said plurality of shipping records comprising originating address information, destination address information, parcel identifier information, date of parcel pickup information, and date of parcel delivery information;

receiving a user identifier from a user;

using said user identifier to determine a user profile associated with said entity;

receiving input from said user comprising a first transaction request executable by one or more processors of said one or more computing devices to select a first subset of shipping records from said plurality of shipping records, wherein said first subset of shipping records comprises two or more records associated with said particular type of item provided by a first supplier affiliated with said entity and delivered to said particular destination;

receiving input from said user comprising a second transaction request executable by said one or more processors of said one or more computing devices to select a second subset of shipping records from said plurality of shipping records, wherein said second subset of shipping records comprises two or more records associated with said particular type of item provided by a second supplier not affiliated with said entity and delivered to said particular destination;

determining how said first and second transaction requests will be processed by said one or more computing devices, wherein said determination is based on whether said first and second suppliers are affiliated with said entity as indicated in said user profile;

in response to: (a) receiving said input from said user; and (b) making said determination that said first supplier is affiliated with said entity, executing said one or more processors to retrieve, from said memory, said first subset of shipping records associated with said particular type of item and said first supplier, wherein said originating address information of each shipping record of said first subset of shipping records corresponds to said first supplier's address and said destination address information of each shipping record of said first subset of shipping records corresponds to said destination's address;

in response to: (a) receiving said input from said user; and (b) making said determination that said second supplier is not affiliated with said entity, executing said one or more processors to retrieve an average delivery time based on said second subset of shipping records associated with said particular type of item and said second supplier from said memory, wherein said originating address information of each shipping record of said second subset of shipping records corresponds to said second supplier's address and said destination address information of each shipping record of said second subset of shipping records corresponds to said destination's address; and executing said one or more processors to forecast, based at least in part on said first subset of shipping records and said average delivery, time the amount of time that it will take said particular carrier to:

deliver said particular type of item from said first supplier to said entity; and deliver said particular type of item from said second supplier to said entity.

2. The method of claim 1, further comprising the steps of:

displaying, to said user, on said one or more computing devices an average time that it has taken said carrier to deliver items from said first supplier to said entity in the past; and displaying, to said user, on said one or more computing devices an average time that it has taken said carrier to deliver items from said second supplier to said entity in the past.

3. The method of claim 2, further comprising the steps of:

displaying, to said user, on said one or more computing devices an average time that it has taken said carrier to deliver items from said first supplier to said entity over a specified period of time; and displaying, to said user, on said one or more computing devices an average time that it has taken said carrier to deliver items from said second supplier to said entity over said specified period of time, wherein said date of parcel pickup information or said date of parcel delivery information of each shipping record of said first and second subsets of shipping records lies within said specified period of time.

\* \* \* \* \*